United States Patent
Wu et al.

(10) Patent No.: US 6,656,581 B2
(45) Date of Patent: *Dec. 2, 2003

(54) INCREMENTALLY STRETCHED NON-EMBOSSED FILMS HAVING HIGH MOISTURE VAPOR TRANSMISSION RATES (MVTRS)

(75) Inventors: Pai-Chuan Wu, Cincinnati, OH (US); Leopoldo V. Cancio, Cincinnati, OH (US)

(73) Assignee: Clopay Plastic Products Company, Inc., Mason, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,374

(22) Filed: Jan. 10, 2000

(65) Prior Publication Data

US 2003/0005999 A1 Jan. 9, 2003

Related U.S. Application Data

(63) Continuation-in-part of application No. 09/080,063, filed on May 15, 1998, now Pat. No. 6,013,151, which is a continuation-in-part of application No. 09/395,627, filed on Sep. 14, 1999, now abandoned.

(51) Int. Cl.$^7$ .............................. B29C 55/12; B29D 7/01
(52) U.S. Cl. .............................. 428/315.5; 428/315.7; 428/317.9; 156/229
(58) Field of Search .................... 428/305.5, 315.5, 428/315.7, 317.9; 442/286, 305, 394; 156/229

(56) References Cited

U.S. PATENT DOCUMENTS

| | | | | |
|---|---|---|---|---|
| 2,714,571 A | 8/1955 | Irion et al. | | 154/139 |
| 3,058,868 A | 10/1962 | Schroeder | | 156/153 |
| 3,137,746 A | 6/1964 | Seymour et al. | | 264/73 |
| 3,484,835 A | 12/1969 | Trounstine et al. | | 161/130 |
| 3,622,422 A | 11/1971 | Newman | | 156/306 |
| 3,832,267 A | 8/1974 | Liu | | 161/116 |
| 4,153,664 A | 5/1979 | Sabee | | 264/289 |
| 4,308,303 A | 12/1981 | Mastroianni et al. | | 428/90 |
| 4,344,999 A | 8/1982 | Gohlke | | 428/212 |

(List continued on next page.)

FOREIGN PATENT DOCUMENTS

EP  141592  5/1985

OTHER PUBLICATIONS

Schwarz, Eckhard C. A., *New Fibrillated Flim Structures, Manufacture and Uses*, Pap. Synth. Conf. (TAPPI), 1976, pp. 33–39.00

*Primary Examiner*—Sam Chuan Yao
(74) *Attorney, Agent, or Firm*—Wood, Herron & Evans, L.L.P.

(57) ABSTRACT

Non-embossed film products permeable to moisture vapor and which act as barriers to liquid are made by a high speed method. The microporous products have high moisture vapor transmission rates (MVTRs) on the order of about 2000 to about 4500 gms/m$^2$/day according to ASTM E96E.

23 Claims, 3 Drawing Sheets

U.S. PATENT DOCUMENTS

| | | | | |
|---|---|---|---|---|
| 4,353,945 | A | 10/1982 | Sampson | 428/90 |
| 4,376,147 | A | 3/1983 | Byrne et al. | 428/167 |
| 4,379,197 | A | 4/1983 | Cipriani et al. | 428/220 |
| 4,443,511 | A * | 4/1984 | Worden et al. | 428/198 |
| 4,452,845 | A | 6/1984 | Lloyd et al. | 428/220 |
| 4,472,328 | A | 9/1984 | Sugimoto et al. | 264/41 |
| 4,517,714 | A | 5/1985 | Sneed et al. | 28/103 |
| 4,522,203 | A | 6/1985 | Mays | 128/132 |
| 4,582,871 | A | 4/1986 | Noro et al. | 524/413 |
| 4,596,738 | A | 6/1986 | Metcalfe et al. | 428/308.4 |
| 4,614,679 | A | 9/1986 | Farrington, Jr. et al. | 428/138 |
| 4,626,574 | A | 12/1986 | Cancio et al. | 525/240 |
| 4,692,368 | A | 9/1987 | Taylor et al. | 428/137 |
| 4,705,812 | A | 11/1987 | Ito et al. | 521/92 |
| 4,705,813 | A | 11/1987 | Ito et al. | 521/92 |
| 4,713,068 | A | 12/1987 | Wang et al. | 604/366 |
| 4,725,473 | A | 2/1988 | Van Gompel | 428/156 |
| 4,753,840 | A | 6/1988 | Van Gompel | 428/171 |
| 4,777,073 | A | 10/1988 | Sheth | 428/155 |
| 4,791,144 | A * | 12/1988 | Nagou et al. | 521/90 |
| 4,814,124 | A | 3/1989 | Aoyama et al. | 264/41 |
| 4,921,652 | A | 5/1990 | Tsuji et al. | 264/41 |
| 4,921,653 | A | 5/1990 | Aoyama et al. | 264/41 |
| 5,035,941 | A | 7/1991 | Blackburn | 428/286 |
| 5,200,247 | A | 4/1993 | Wu et al. | 428/131 |
| 5,202,173 | A | 4/1993 | Wu et al. | 428/131 |
| 5,296,184 | A | 3/1994 | Wu et al. | 264/154 |
| 5,407,979 | A | 4/1995 | Wu et al. | 524/47 |
| 5,409,761 | A | 4/1995 | Langley | 428/198 |
| 5,732,716 | A | 3/1998 | Utecht | 128/898 |
| 5,865,926 | A | 2/1999 | Wu et al. | 156/229 |
| 5,883,028 | A * | 3/1999 | Morman et al. | 442/394 |
| 5,932,497 | A * | 8/1999 | Morman et al. | 442/286 |
| 6,013,151 | A | 1/2000 | Wu | 156/229 |
| 6,072,005 | A * | 6/2000 | Kobylivker et al. | 525/240 |
| 6,096,014 | A * | 8/2000 | Haffner et al. | 604/367 |

* cited by examiner

INCREMENTALLY STRETCHED NON-EMBOSSED FILMS HAVING HIGH MOISTURE VAPOR TRANSMISSION RATES (MVTRS)

RELATED APPLICATION

This application is a continuation-in-part application of application Ser. No. 09/080,063, filed May 15, 1998, now U.S. Pat. No. 6,013,151, which is a continuation-in-part of application Ser. No. 09/395,627, filed Sep. 14, 1999, now abandoned which are incorporated herein in their entireties by reference.

BACKGROUND OF THE INVENTION

Methods of making plastic film and nonwoven laminates date back many years. For example, more than thirty years ago U.S. Pat. No. 3,484,835 (1968) issued to Trounstine, et al., and it is directed to embossed plastic film having desirable handling characteristics and fabricating useful articles such as diapers. Since that time, many patents have issued in the field. U.S. Pat. No. 5,202,173 issued on Apr. 13, 1993, for an ultra-soft thermoplastic film which was made by incrementally stretching the embossed film to achieve breathability. The film may include fillers. Polymer films of polycaprolactone (PCL) and starch polymer or polyvinyl alcohol (PVOH) upon incremental stretching also produce breathable products, as disclosed in U.S. Pat. Nos. 5,200,247 and 5,407,979. More recently, U.S. Pat. No. 5,865,926 issued for a method of making a cloth-like microporous laminate of a nonwoven fibrous web and thermoplastic film having air and moisture vapor permeabilities with liquid-barrier properties.

Methods of making microporous film products have also been known for some time. For example, U.S. Pat. No. 3,832,267, to Liu, teaches the melt-embossing of a polyolefin film containing a dispersed amorphous polymer phase prior to stretching or orientation to improve gas and moisture vapor transmission of the film. According to the Liu '267 patent, a film of crystalline polypropylene having a dispersed amorphous polypropylene phase is first embossed prior to biaxially drawing (stretching) to produce an oriented imperforate film having greater permeability. The dispersed amorphous phase serves to provide microvoids to enhance the permeability of the otherwise imperforate film to improve moisture vapor transmission rates (MVTRs). The embossed film is preferably embossed and drawn sequentially.

In 1976, Schwarz published a paper which described polymer blends and compositions to produce microporous substrates (Eckhard C. A. Schwartz (Biax-Fiberfilm), "New Fibrillated Film Structures, Manufacture and Uses", *Pap. Synth. Conf. (TAPPI)*, 1976, pages 33–39). According to this paper, a film of two or more incompatible polymers, where one polymer forms a continuous phase and a second polymer forms a discontinuous phase, upon being stretched will phase separate thereby leading to voids in the polymer matrix and increasing the porosity of the film. The continuous film matrix of a crystallizable polymer may also be filled with inorganic filler such as clay, titanium dioxide, calcium carbonate, etc., to provide microporosity in the stretched polymeric substrate.

Many other patents and publications disclose the phenomenon of making microporous thermoplastic film products. For example, European patent 141592 discloses the use of a polyolefin, particularly ethylene vinyl acetate (EVA) containing a dispersed polystyrene phase which, when stretched, produces a voided film which improves the moisture vapor permeability of the film. This EP '592 patent also discloses the sequential steps of embossing the EVA film with thick and thin areas followed by stretching to first provide a film having voids which, when further stretched, produces a net-like product. U.S. Pat. Nos. 4,452,845 and 4,596,738 also disclose stretched thermoplastic films where the dispersed phase may be a polyethylene filled with calcium carbonate to provide the microvoids upon stretching. Later U.S. Pat. Nos. 4,777,073; 4,814,124; and 4,921,653 disclose the same processes described by the above-mentioned earlier publications involving the steps of first embossing a polyolefin film containing a filler and then stretching that film to provide a microporous product.

With reference to U.S. Pat. Nos. 4,705,812 and 4,705,813, microporous films have been produced from a blend of linear low density polyethylene (LLDPE) and low density polyethylene (LDPE) with barium sulfate as the inorganic filler having an average particle diameter of 0.1–7 microns. It is also known to modify blends of LLDPE and LDPE with a thermoplastic rubber such as Kraton. Other patents, such as U.S. Pat. No. 4,582,871, disclose the use of thermoplastic styrene block tripolymers in the production of microporous films with other incompatible polymers such as styrene. There are other general teachings in the art such as the disclosures in U.S. Pat. Nos. 4,472,328 and 4,921,652.

Relevant patents regarding extrusion lamination of unstretched nonwoven webs include U.S. Pat. Nos. 2,714,571; 3,058,868; 4,522,203; 4,614,679; 4,692,368; 4,753,840 and 5,035,941. The above '863 and '368 patents disclose stretching extruded polymeric films prior to laminating with unstretched nonwoven fibrous webs at pressure roller nips. The '203 and '941 patents are directed to co-extruding multiple polymeric films with unstretched nonwoven webs at pressure roller nips. The '840 patent discloses preforming nonwoven polymeric fiber materials prior to extrusion laminating with films to improve bonding between the nonwoven fibers and films. More specifically, the '840 patent discloses conventional embossing techniques to form densified and undensified areas in nonwoven base plies prior to extrusion lamination to improve bonding between nonwoven fibrous webs and films by means of the densified fiber areas. The '941 patent also teaches that unstretched nonwoven webs that are extrusion laminated to single ply polymeric films are susceptible to pinholes caused by fibers extending generally vertically from the plane of the fiber substrate and, accordingly, this patent discloses using multiple co-extruded film plies to prevent pinhole problems. Furthermore, methods for bonding loose nonwoven fibers to polymeric film are disclosed in U.S. Pat. Nos. 3,622,422; 4,379,197 and 4,725,473.

It has also been known to stretch nonwoven fibrous webs using intermeshing rollers to reduce basis weight and examples of patents in this area are U.S. Pat. Nos. 4,153,664 and 4,517,714. The '664 patent discloses a method of incremental cross direction (CD) or machine direction (MD) stretching nonwoven fibrous webs using a pair of interdigitating rollers to strengthen and soften nonwoven webs. The '664 patent also discloses an alternative embodiment wherein the nonwoven fibrous web is laminated to the thermoplastic film prior to intermesh stretching.

Efforts have also been made to make breathable nonwoven composite barrier fabrics which are impervious to liquids, but which are permeable to water vapor. U.S. Pat. No. 5,409,761 is an example of a fabrication process from the patent art. According to this '761 patent, a nonwoven composite fabric is made by ultrasonically bonding a microporous thermoplastic film to a layer of nonwoven fibrous thermoplastic material. These methods and other methods of making breathable laminates of nonwoven and thermoplastic materials tend to involve expensive manufacturing techniques and/or expensive raw materials.

U.S. Pat. No. 5,865,926 discloses a method of making a microporous laminate of a nonwoven web and thermoplastic film which is conducted on high-speed production machinery on the order of about 200–500 fpm. Breathable composites were made having MVTRs up to about 1700 gms/m$^2$/day at 100° F. and 90% relative humidity (RH).

Notwithstanding the extensive development of the art for making breathable microporous films and laminates to provide air and moisture vapor permeabilities with liquid-barrier properties, further improvements are needed. In particular, improvements are desired for producing microporous film products and laminates on high-speed production machinery. It would be very desirable to produce microporous film products without undesirable pin holes and without draw resonance. In the past, attempts to increase production speeds have resulted in film breakage or film products with inconsistent properties.

SUMMARY OF THE INVENTION

This invention is direct to incrementally stretched non-embossed films having high MVTRs greater than about 2000 gms/m$^2$/day at 100° F. and 95% relative humidity (RH) according to ASTM E96E. These non-embossed (flat) microporous films are permeable to air and water vapor, but are barriers to liquid.

In the above-identified patent application Ser. No. 09/080,063, incrementally stretched non-embossed films were disclosed having high MVTRs. It was reported in that application that MVTRs for embossed film on the order of about 1200–1400 gms/m$^2$/day were achieved, whereas MVTRs for flat or unembossed film on the order of about 1900–3200 gms/m$^2$/day were achieved. This invention is directed to further improvements of incrementally stretched non-embossed films having high MVTRs, preferably on the order of about 2000 to about 4500 gms/m$^2$/day. Breathable laminates of the microporous flat film with nonwoven substrates are also produced at high speeds according to the method of this invention.

In a broad form of the invention, the high MVTR film comprises a blend of a thermoplastic polymer and a mechanical pore-forming agent such as an inorganic filler (CaCO$_3$). The pore-forming agent in the film or laminate is activated upon incremental stretching to form a microporous film or laminate of a fibrous web and film. While any one of a number of thermoplastic polymers or blends may be employed along with pore-forming agents of inorganic or organic materials, there are certain preferred compositions or modes of practice as described herein.

In one form of the invention, the microporous flat film is made by melt-blending a composition comprising
(a) about 30% to about 45% by weight of a linear low density polyethylene,
(b) about 1% to about 10% by weight of a low density polyethylene,
(c) about 40% to about 60% by weight calcium carbonate filler particles, and, optionally,
(d) about 2% to about 6% by weight of a triblock copolymer of styrene selected from the group consisting of styrene-butadiene-styrene, styrene-isoprene-styrene, and styrene-ethylene-butylene-styrene, and blends thereof.

The melt-blended composition is extruded, preferably through a slot die, into a nip of rollers with an air knife to form a film at a speed on the order of at least about 550 fpm to about 1200 fpm without draw resonance. Speeds of at least about 750 fpm to about 1200 fpm, or greater, have been achieved without draw resonance. The use of the air knife to assist in the elimination of draw resonance is known, for example, by reference to U.S. Pat. No. 4,626,574. Thereafter, an incremental stretching force is applied to the film at the high speeds along lines substantially uniformally across the film and throughout its depth to provide a microporous film. Thus, this invention provides a high speed method of making microporous films and laminates with nonwoven substrates of uniform gauge. The problem of draw resonance which has heretofore resulted in irregular gauge or thickness in the film products is avoided, even though line speeds of about 750–1200 fpm are achieved.

The blend of LLDPE and LDPE within the approximate ranges of components enables the production of film without breakage and pin holes when balanced with the prescribed amount of calcium carbonate. In particular, the LLDPE is present in an amount of about 35% to about 45% by weight in order to provide a sufficient amount of matrix to carry the calcium carbonate filler particles thereby enabling the film to be handled and stretched without pin holing and breakage. The LDPE in an amount of about 3% to about 10% by weight also contributes to the production of film without pin holing and enables the high speed production without draw resonance. The polymeric matrix is balanced with an amount of about 40% to about 55% by weight of calcium carbonate particles having an average particle diameter of preferably about 1 micron to achieve sufficient MVTR in greater than 2000 gms/m$^2$/day, or in the range of about 2000–4500, or more, gms/m$^2$/day. Furthermore, the melt-blended composition may include a triblock polymer in an amount of about 0% to about 6% by weight to facilitate stretching in high-speed production without breakage. Other components such as about 5% by weight high density polyethylene (HDPE) and about 1% by weight antioxidants/processing aids are used. An incremental stretching force is applied inline to the formed film under ambient conditions or at an elevated temperature at speeds of at least about 550 fpm to about 1200 fpm, or more, along lines substantially uniformly across the film and throughout it depth to provide a microporous film.

The method of this invention also involves lamination of the microporous-formable thermoplastic film to a nonwoven fibrous web during extrusion. The extrusion lamination is conducted at the same high speeds where a nonwoven fibrous web is introduced into the nip of rollers along with the microporous-formable thermoplastic extrudate. The compressive force between the fibrous web and the extrudate is controlled to bond one surface of the web to the film and form a laminate. The laminate is then incrementally stretched along lines substantially uniformly across the laminate and throughout its depth in one direction to render the film microporous. The laminate may be stretched in both the cross direction and the machine direction to provide breathable cloth-like liquid barriers capable of transmitting moisture vapor and air.

Other benefits, advantages and objectives of this invention will be further understood with reference to the following detailed description.

DETAILED DESCRIPTION OF THE INVENTION

It is the primary objective of this invention to produce an incrementally stretched non-embossed film having a high MVTR greater than about 2000 gms/m²/day to about 4500 gms/m²/day at about 95% relative humidity (RH) at 100° F. (according to ASTM E96E). It is the further objective to produce such a microporous film and laminated products thereof with nonwoven fibrous webs on high-speed production machinery. It is the further objective of the method to produce such microporous film products of regular gauge, uniform porosity and without breakage.

A. Materials for the Method

The thermoplastic polymer for the film preferably is of the polyolefin type and may be any of the class of thermoplastic polyolefin polymers or copolymers that are processable into a film or for direct lamination by melt extrusion onto the fibrous web. A number of thermoplastic copolymers suitable in the practice of the invention are of the normally-solid oxyalkanoyl polymers or dialkanoyl polymers represented by poly(caprolactone) blended with polyvinylalcohol or starch polymers that may be film-formed. The olefin based polymers include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins. Other examples of polymers suitable for use as films include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly (ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber. This new class of rubber-like polymers may also be employed and they are generally referred to herein as metallocene polymers or polyolefins produced from single-cite catalysts. The most preferred catalysts are known in the art as metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly (ethylene-octene), poly(ethylene-propylene), and/or polyolefin terpolymers thereof.

The microporous-formable film composition can be achieved by formulating a thermoplastic polymer with suitable additives and pore-forming fillers to provide an extrudate or film for lamination with the nonwoven web. Calcium carbonate and barium sulfate particles are the most common fillers. Microporous-formable compositions of polyolefins, inorganic or organic pore-forming fillers and other additives to make microporous sheet materials are known. This method may be done in line and provides economies in manufacturing and/or materials over known methods of making laminates. In addition, as developed above, microporous-formable polymer compositions may be obtained from blends of polymers such as a blend of an alkanoyl polymer and polyvinyl alcohol as described in U.S. Pat. No. 5,200,247. In addition, blends of an alkanoyl polymer, destructured starch and an ethylene copolymer may be used as the microporous-formable polymer composition as described in U.S. Pat. No. 5,407,979. With these polymer blends, it is unnecessary to use pore-forming fillers to provide microporosity upon incremental stretching. Rather, the different polymer phases in the film themselves, when the film is stretched at ambient or room temperature, produce microvoids.

As developed above, these and other objectives are achieved in a preferred form of the invention by first melt blending a composition of
- (a) about 30% to about 45% by weight of a linear low density polyethylene,
- (b) about 1% to about 10% by weight of a low density polyethylene,
- (c) about 40% to about 60% by weight calcium carbonate filler particles, and, optionally,
- (d) about 2% to about 6% by weight of a triblock copolymer of styrene selected from the group consisting of styrene-butadiene-styrene, styrene-isoprene-styrene, and styrene-ethylene-butylene-styrene, and blends thereof, extruding said melt blended composition into a nip of rollers form a film at a speed on the order of at least about 550 fpm to about 1200 fpm without draw resonance, and applying an incremental stretching force to said film at said speed along lines substantially uniformly across said film and throughout its depth to provide a microporous film.

More particularly, in a preferred form, the melt-blended composition consists essentially of about 42% by weight LLDPE, about 4% by weight LDPE, about 44% by weight calcium carbonate filler particles having an average particle size of about 1 micron, and, optionally, about 3% by weight triblock polymer, especially styrene-butadiene-styrene. If desired, the stiffness properties of the microporous film products may be controlled by including high density polyethylene on the order of about 0–5% by weight and including 0–4% by weight titanium dioxide. Typically, processing aid such as a flurocarbon polymer in an amount of about 0.1% to about 0.2% by weight is added, as exemplified by 1-propene,1,1,2,3,3,3-hexafluoro copolymer with 1,1-difluoroethylene. The triblock polymer may also be blended with oil, hydrocarbon, antioxidant and stabilizer. Antioxidants include tetrakis (methylene(3,5-di-tert-butyl-4-hydroxyhydrocinnamate))methane (trade name is Irganox 1010), and tris(2,4-di-tert-butylphenyl)phosphite (trade name is Irgafos 168) at a total of 500–4000 ppm (parts per million).

In the above method, the melt-blended composition is slot-die extruded as a web through a cooling zone provided by an air knife, then into a nip of rollers to form a film at high speeds. Use of the air knife, as developed above, assists in the elimination of draw resonance, as is known, for example, by reference to U.S. Pat. No. 4,626,574. In addition, as described in pending U.S. application Ser. No. 09/395,627, filed Sep. 14, 1999, which is incorporated herein in its entirety by reference. Devices for directing a stream of cooling gas to flow in the cooling zone substantially parallel to the web surface are used. For example, devices as shown in U.S. Pat. Nos. 4,718,178 and 4,779,355 may be used and the entire disclosures of these patents are also incorporated herein by reference. After cooling, an incremental stretching force is applied to the film or the laminate at high speeds along lines substantially uniformly across the film and throughout it depth to provide the incrementally stretched flat film having a high MVTR.

The flat films are produced according to the principles of this invention upon extrusion of a web into a nip of rollers which provide a polished chrome surface to form a flat film. The flat film, upon incremental stretching, at high speeds, produces microporous film products having a high MVTR of greater than 2000 gms/m²/day. It has been found that flat film can be incrementally stretched more uniformly than embossed film. The process may be conducted at ambient or room temperature or at elevated temperatures. As described above, laminates of the flat microporous film may be obtained with nonwoven fibrous webs.

The nonwoven fibrous web may comprise fibers of polyethylene, polypropylene, polyesters, rayon, cellulose, nylon, and blends of such fibers. A number of definitions have been proposed for nonwoven fibrous webs. The fibers are usually staple fibers or continuous filaments. The nonwovens are usually referred to as spunbond, carded, meltblown, and the like. The fibers or filaments may be bicomponent to facilitate bonding. For example, a fiber having a sheath and core of different polymers such as polyethylene (PE) and polypropylene (PP) may be used; or mixtures of PE and PP fibers may be used. As used herein "nonwoven fibrous web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, Association of the Nonwoven Fabrics Industry, 3d Edition (1992).

In a preferred form, the microporous laminate employs a film having a gauge or a thickness between about 0.25 and 10 mils and, depending upon use, the film thickness will vary and, most preferably, in disposable applications is the order of about 0.25 to 2 mils in thickness. The nonwoven fibrous webs of the laminated sheet normally have a weight of about 5 gms/yd$^2$ to 75 gms/yd$^2$, preferably about 20 to about 40 gms/yd$^2$. The composite or laminate can be incrementally stretched in the cross direction (CD) to form a CD stretched composite. Furthermore, CD stretching may be followed by stretching in the machine direction (MD) to form a composite which is stretched in both CD and MD directions. As indicated above, the microporous film or laminate may be used in many different applications such as baby diapers, baby training pants, catamenial pads and garments, and the like where moisture vapor and air transmission properties, as well as fluid barrier properties, are needed.

B. Stretchers for the Microporous Film and Laminates

A number of different stretchers and techniques may be employed to stretch the film or laminate of a nonwoven fibrous web and microporous-formable film. These laminates of nonwoven carded fibrous webs of staple fibers or nonwoven spun-bonded fibrous webs may be stretched with the stretchers and techniques described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched film or laminate of nonwoven fibrous web and microporous-formable film to form the microporous film products of this invention. For example, The stretching operation may be employed on an extrusion laminate of a nonwoven fibrous web of staple fibers or spun-bonded filaments and microporous-formable thermoplastic film. In one of the unique aspects of this invention a laminate of a nonwoven fibrous web of spun-bonded filaments may be incrementally stretched to provide a very soft fibrous finish to the laminate that looks like cloth. The laminate of nonwoven fibrous web and microporous-formable film is incrementally stretched using, for instance, the CD and/or MD intermeshing stretcher with one pass through the stretcher with a depth of roller engagement at about 0.060 inch to 0.120 inch at speeds from about 550 fpm to 1200 fpm or faster. The results of such incremental or intermesh stretching produces laminates that have excellent breathability and liquid-barrier properties, yet provide superior bond strengths and soft cloth-like textures.

The following examples illustrate the method of making microporous film and laminates of this invention. In light of these examples and this further detailed description, it is apparent to a person of ordinary skill in the art that variations thereof may be made without departing from the scope of this invention.

BRIEF DESCRIPTION OF THE DRAWINGS

The invention is further understood with reference to the drawings in which.

EXAMPLES 1–5

Blends of LLDPE and LDPE having the compositions reported in the following TABLE 1 were extruded to form films and the films were then incrementally stretched to provide microporous films.

TABLE 1

| Formulation (by wt.) | 1 | 2 | 3 | 4 | 5 |
| --- | --- | --- | --- | --- | --- |
| CaCO$_3$ | 44.2 | 44.2 | 44.2 | 44.2 | 44.2 |
| LLDPE | 44.1 | 44.9 | 41.9 | 41.9 | 41.9 |
| LDPE | 1.5 | 3.7 | 3.7 | 3.7 | 3.7 |
| Others* | 10.2 | 10.2 | 10.2 | 10.2 | 10.2 |
| Screw A | 33 | 45 | 57 | 64 | 75 |
| RPM B | 33 | 45 | 57 | 64 | 75 |
| Basis wt. (gms/m$^2$) | 45 | 45 | 45 | 45 | 45 |
| Gauge (mils) | 2 | 2 | 2 | 2 | 2 |
| Line Speed (fpm) | 550 | 700 | 900 | 1000 | 1200 |
| Air Knife (cfm/inch) | 5-25 | 5-25 | 5-25 | 5-25 | 5-25 |
| Web Stability | Poor gauge control with draw resonance | Good web stability without draw resonance | | | |

*Other components include 2.5% by weight of a styrene-butadiene-styrene (SBS) triblock polymer, Shell Kraton 2122X, which is an SBS <50% by wt. + mineral oil <30% by wt., EVA copolymer <15% by wt., polystyrene <10% by wt., hydrocarbon resin <10% by wt., antioxidant/stabilizer <1% by wt., and hydrated amorphous silica <1% by wt.

Figure 1:
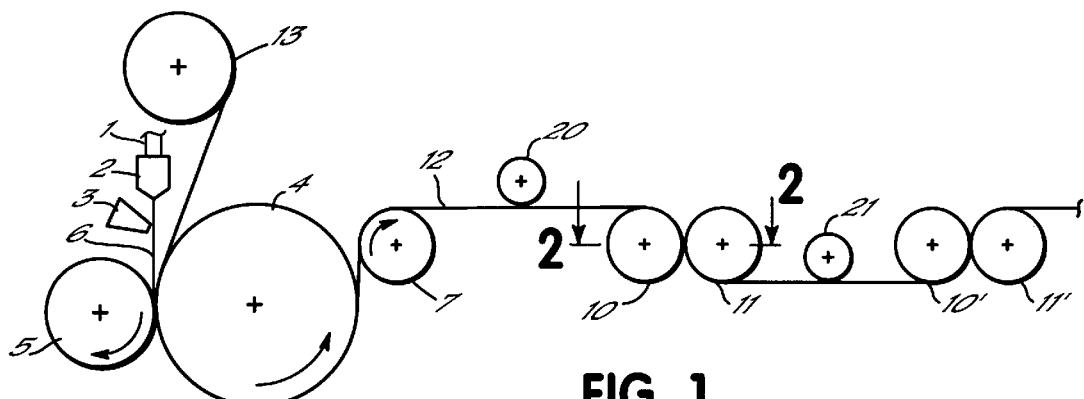
FIG. 1 is a schematic of an inline extrusion lamination and incremental stretching apparatus for making the microporous laminate of this invention.
Figure 2:
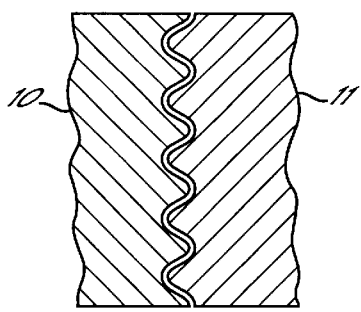
FIG. 2 is a cross sectional view taken along the line 2—2 of FIG. 1 illustrating the intermeshing rollers in diagrammatic form.

Each of the formulations of 1–5 were extruded into films employing an extrusion apparatus as shown diagramatically in FIG. 1. As shown, the apparatus may be employed for film extrusion with and without lamination. In the case of film extrusion, the formulations of Examples 1–5 were fed from an extruder 1 through slot die 2 to form the extrudate 6 into the nip of a rubber roll 5 and a metal roll 4 with an air knife 3. Where extrusion lamination is practiced, there is an incoming web of fibrous material 9 from roller 13 which is also introduced into the nip of the rubber roll 5 and metal roll 4. In Examples 1–5, the thermoplastic film was produced for subsequent incremental stretching to form the microporous film. As shown in TABLE 1, over speeds of about 550 fpm to 1200 fpm, a polyethylene film 6 on the order of about 2 mils in thickness was made which is taken off at roller 7. The air knife 3 has a length of about 120" and an opening of about 0.035"–0.060" and air is blown through the opening and against the extrudate 6 at about 5 cfm/inch to 25 cfm/inch. The compressive force at the nip and the air knife are controlled such that the film is made without pin holing and without draw resonance in the case of Examples 2–5. Where the LDPE was included in the composition at a level of 1.5% by weight, draw resonance was encountered at a line speed of 550 fpm. However, when the LDPE was included in the formulation at a level of 3.7% by weight with the LLDPE at a level of 44.1–44.9% by weight, film production was able to be achieved at high speeds greater than 550 fpm up to 1200 fpm without draw resonance. The melt temperatures from the feed zone to the screw tip of extruders A and B were maintained at about 400–430° F. with die temperatures of approximately 450° F. to extrude the precursor film around 2 mils (45 gms/m$^2$).

Figure 3:
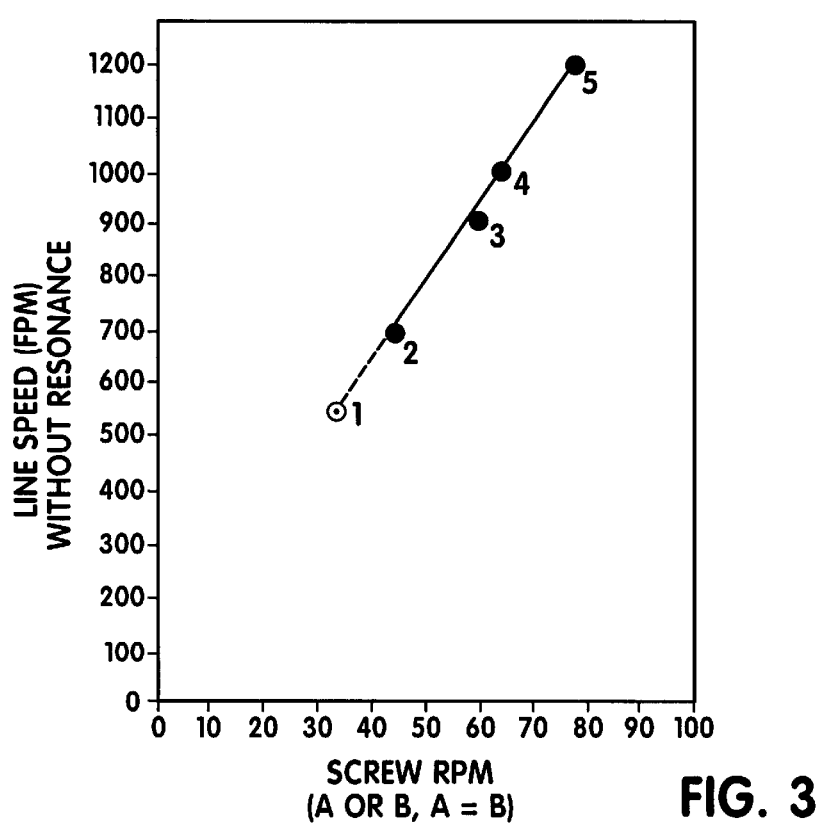
FIG. 3 is a graph demonstrating the line speeds for Examples 1–5.

FIG. 3 is a graph demonstrating the line speeds for Examples 1–5. Example 1, which contained only 1.5% by weight of LDPE, resulted in a poor film gauge control with draw resonance even with the air knife 3. However, when the LDPE was increased to about 3.7% by weight, excellent web stability was achieved without draw resonance even when line speeds were increased to about 1200 fpm. This is shown diagramatically in FIG. 3.

Figure 4:
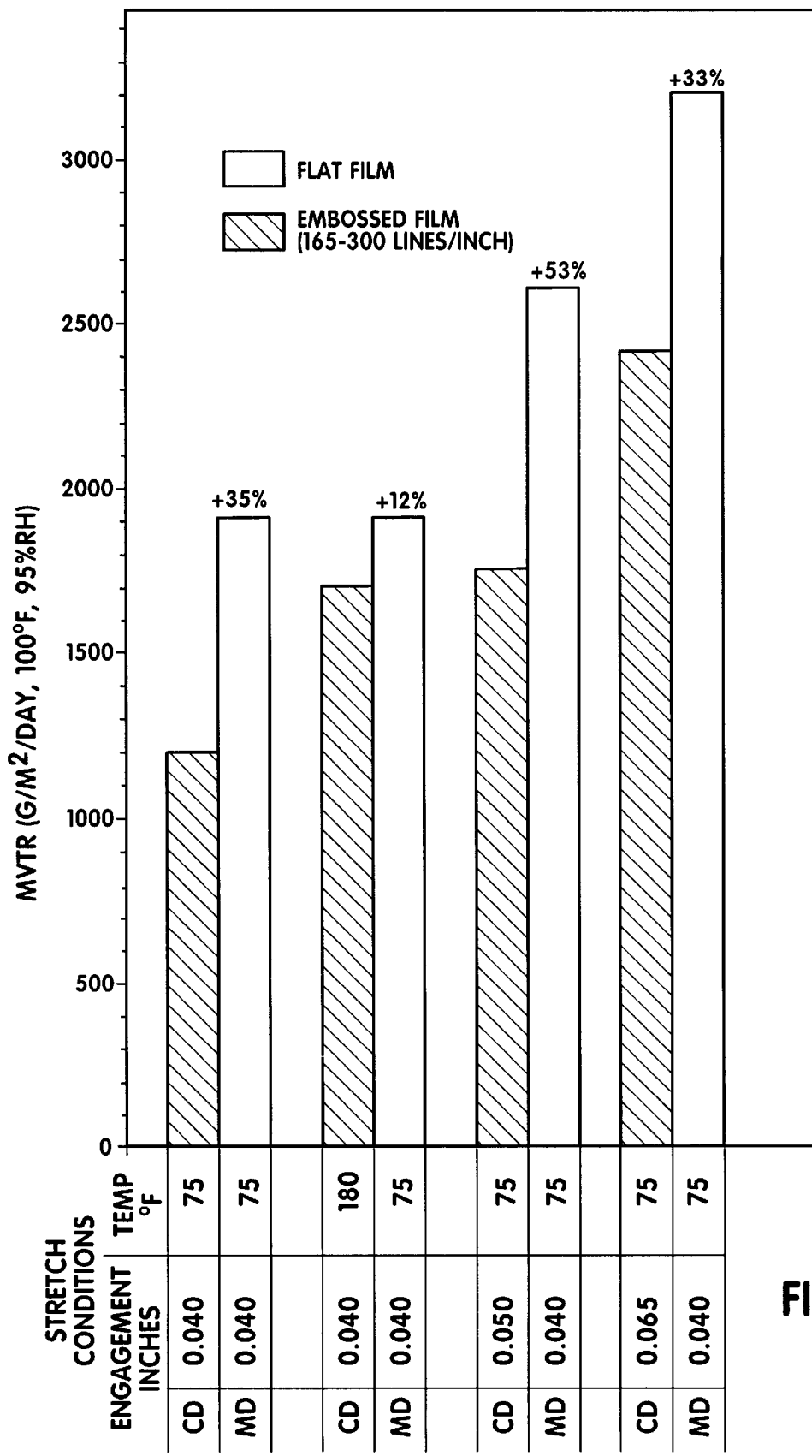
FIG. 4 is a graph demonstrating the moisture vapor transmission properties of both embossed and flat microporous films.
Figure 5:
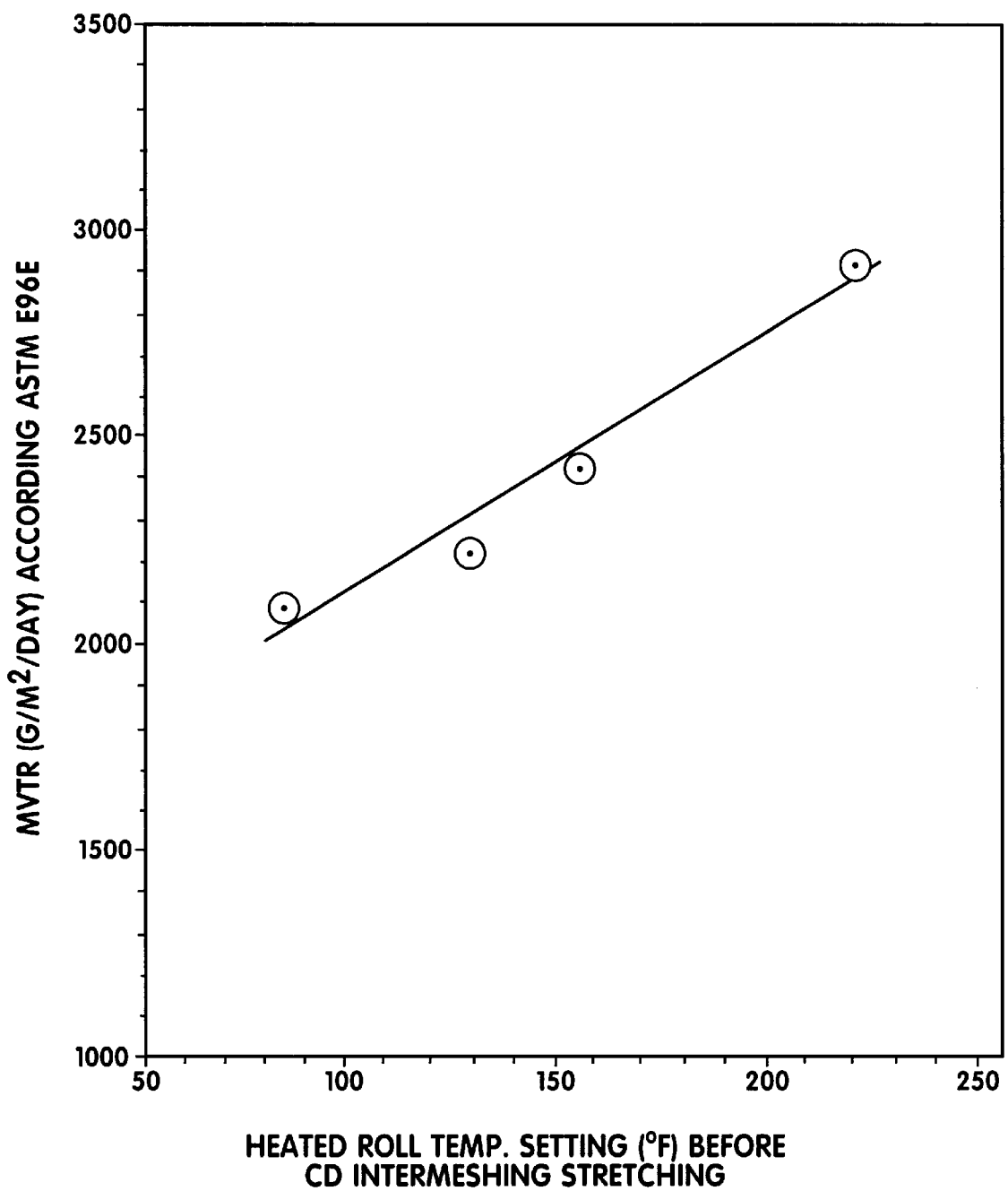
FIG. 5 is a graph demonstrating the moisture vapor transmission rate can be adjusted by heating the precursor film.

FIG. 4 is a graph demonstrating the moisture vapor transmission properties of both embossed and flat films resulting from incrementally stretching the precursor films of Examples 2–5 under different temperatures and stretch roller engagement conditions. As shown schematically in FIG. 1, where the incoming film 12 at ambient temperature was passed through temperature controlled rollers 20 and 21 before CD and MD incremental stretching rollers (10 and 11, and 10' and 11'), the temperatures and the depths of engagements can be controlled. Remarkably, the MVTR of the flat film exceeded the MVTR of the embossed film as shown in FIG. 4. In brief, MVTRs for the embossed film on the order of about 1200–2400 gms/m²/day were achieved, whereas MVTRs for the flat film on the order of about 1900–3200 gms/m²/day were achieved. Unexpectedly, as also shown in FIG. 5, the MVTR of the microporous film can also be controlled by the web temperature during the stretching. FIG. 5 shows the film when heated to different temperatures before CD stretching can result in different MVTRs. The data reported in FIG. 5 was for a CD rollers engagement dept of 0.065" and MD rollers engagement depth of 0.040" where the temperature of roller 21 was maintained at ambient. The embossed film was made with a metal embossing roller having a rectangular engraving of CD and MD lines with about 165–300 lines per inch. This pattern is disclosed, for example, in U.S. Pat. No. 4,376,147 which is incorporated herein by reference. This micro pattern provides a matte finish to the film but is undetectable to the naked eye.

EXAMPLE 6

Other blends of LLDPE, LDPE and HDPE having the compositions reported in the following TABLE 2 were extruded to form flat films and the films were then incrementally stretched to provide microporous films having high MVTRs greater than about 2000 gms/m²/day, for example from about 2000 to 4500 gms/m²/day.

TABLE 2

| Formulation (by wt.): | |
| --- | --- |
| CaCO₃ | 45 |
| LLDPE | 41 |
| LDPE | 5 |
| HDPE | 5 |
| TiO₂ | 3 |
| Antioxidant/processing aid | 1 |
| Basis Weight (gms/m²) | 40 |
| Gauge (mils) | 1.2 |
| Line Speed (fpm) | 900 |
| ACD No. 1 (cfm/foot) | 68 |
| ACD No. 2 (cfm/foot) | 113 |
| Web Stability | Good, without draw resonance |

The formulation of TABLE 2 was extruded into films employing an extrusion apparatus similar to that as shown diagramatically in FIG. 1. As shown, the apparatus may be employed for film extrusion with and without lamination. In the case of film extrusion, the formulation of EXAMPLE 6 is fed from an extruder 1 through slot die 2 to form the extrudate 6 into the nip of a rubber roll 5 and a metal roll 4. The metal roll is a polished chrome roll. Instead of the air knife, two air cooling devices (ACD), ACD No. 1 and ACD No. 2 are used, but they are not shown on the drawing. Again, where extrusion lamination is practiced, there is an incoming web of fibrous material 9 from roller 13 which is also introduced into the nip of the rubber roll 5 and metal roll 4. In EXAMPLE 6, the thermoplastic film is produced for subsequent incremental stretching to form the microporous film. As shown in TABLE 2, a polyethylene film 6 on the order of about 1.2 mils in thickness is made at a speed of about 900 fpm, which is taken off at roller 7. The ACDs have dimensions approximating the web width with a sufficient manifold sized to deliver the cooling air. As stated above, these ACDs are described in more detail in the above mentioned U.S. Pat. Nos. 4,718,178 and 4,779,355 patents. The air velocity blown through the nozzle of ACD No. 1 and against the extrudate 6 is about 4000 fpm at the exit of the nozzle, and air volume is 68 cfm per foot. The air velocity of ACD No. 2 is about 6800 fpm at the exit of the nozzle, and the air volume is 113 cfm per foot. The ACD No. 1 is located about 3.7 inches (95 mm) from the die and about 1 inch (25 mm) from the web 6. The ACD No. 2 is located on the opposite side of the web 6 about 11.2 inches (2.85 mm) from the die and about 0.6 inches (15 mm) from the web. The nip of the rubber roll 5 and metal roll 4 is located about 29 inches (736 mm) from the die. The compressive force at the nip and the ACDs are controlled such that the film is made without pin holing and without draw resonance. The melt temperatures from the slot die feed zone to the screw tip of extruders A and B (not shown) were maintained to provide an extrudate temperature of about 243° C. with cooling gas from the ACDs No. 1 and No. 2 decreasing the web temperatures to 211° C.–181° C. before entering the nip. In this EXAMPLE 6, with reference to FIG. 1, where the incoming film 12 at ambient temperature is passed through temperature controlled rollers 20 and 21 before CD and MD incremental stretching rollers (10 and 11, and 10' and 11'), the temperatures and the depths of engagements can be controlled. In brief, moisture vapor transmission rates (MVTRs) for the flat film on the order of about 2000–4500 gms/m²/day are achieved. The MVTR of the microporous film can also be controlled by the web temperature during the stretching. When the film is heated to different temperatures before CD stretching, different MVTRs can result.

As reported in patent application Ser. No. 09/395,627, filed Sep. 14, 1999, it has been found that ACDs which provide a substantially parallel cooling air flow with vortices over the web surface efficiently cool the web. Surprisingly, web draw resonance which one may normally encounter in prior techniques has been eliminated or controlled at high speeds of about 500–1200 fpm of the web. Furthermore, as also reported in that application, when laminates of film and nonwoven are made, the bond strengths are very effectively achieved at targets which have not been possible with other known methods of cooling while at the same time maintaining film gauge controls, even at web high speeds.

In view of the above detailed description, it will be understood that variations will occur in employing the principles of this invention depending upon materials and conditions, as will be understood by those of ordinary skill in the art.

What is claimed is:

1. An incrementally stretched non-embossed film having a high moisture vapor transmission rate (MVTR) comprising a thermoplastic polymer containing a dispersed phase of pore-forming particles selected from the group consisting of inorganic filler and an organic material, said film having a non-embossed surface and a thickness with incrementally stretched areas to provide microporosity by said pore-forming particles in the film having a high MVTR greater than about 2000 gms/m²/day according to ASTM E96E, said MVTR of the non-embossed film being greater than the MVTR of a comparable embossed film which is incrementally stretched under essentially the same conditions.

2. The film of claim 1 wherein the MVTR is on the order of about 2000 to about 4500 gms/m²/day according to ASTM E96E.

3. The film of claim 1 wherein the thermoplastic composition is a polymer selected from the group consisting of polyethylene, polypropylene, and copolymers thereof.

4. The film of claim 1 wherein said thermoplastic composition is an elastomeric polymer.

5. The film of claim 4 wherein said elastomeric polymer is selected from the group consisting of poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), and ethylene-propylene rubber.

6. The film of claim 1 wherein said inorganic filler is selected from the group consisting of calcium carbonate and barium sulfate.

7. The film of claim 1 laminated to a fibrous web.

8. The film of claim 7 wherein the fibers of said fibrous web are selected from the group consisting of polypropylene, polyethylene, polyesters, cellulose, rayon, nylon, and blends or co-extrusions of two or more of such fibers.

9. The film of claim 7 wherein the fibrous web has a weight from about 5 to about 70 gms/yd$^2$ and the microporous film has a thickness on the order of about 0.25 to about 10 mils.

10. The film of claim 1 wherein said film has a thickness on the order of about 0.25 to about 10 mils.

11. The film of claim 1 wherein the film composition comprises
   (a) about 30% to about 45% by weight of a linear low density polyethylene,
   (b) about 1% to about 10% by weight of a low density polyethylene, and
   (c) about 40% to about 60% by weight of calcium carbonate filler particles.

12. The film of claim 11 wherein the composition further contains high density polyethylene and titanium dioxide.

13. An incrementally stretched non-embossed film having a high moisture vapor transmission rate (MVTR) produced by a process comprising the steps of
   melt blending a thermoplastic polymer and pore-forming filler particles to form a microporous-formable thermoplastic polymer composition,
   cast extruding a non-embossed precursor film of the composition, and
   incrementally stretching the non-embossed precursor film to impart microporosity by said pore-forming particles in the film having a high MVTR greater than about 2000 gms/m$^2$/day according to ASTM E96E, said MVTR of the non-embossed film being greater than the MVTR of a comparable embossed film which is incrementally stretched under essentially the same conditions.

14. The film of claim 13 wherein the thermoplastic composition is a polymer selected from the group consisting of polyethylene, polypropylene, and copolymers thereof.

15. The film of claim 13, wherein said thermoplastic composition is an elastomeric polymer.

16. The film of claim 13 wherein said elastomeric polymer is selected from the group consisting of poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), and ethylene-propylene rubber.

17. The film of claim 13 wherein said inorganic filler is selected from the group consisting of calcium carbonate and barium sulfate.

18. The film of claim 13 laminated to a fibrous web.

19. The film of claim 18 wherein the fibers of said fibrous web are selected from the gbroup consisting of polypropylene, polyethylene, polyesters, cellulose, rayon, nylon, and blends or co-extrusions of two or more of such fibers.

20. The film of claim 18 wherein the fibrous web has a weight from about 5 to about 70 gms/yd$^2$ and the microporous film has a thickness on the order of about 0.25 to about 10 mils.

21. The film of claim 13 wherein said film has a thickness on the order of about 0.25 to about 10 mils.

22. The film of claim 13 wherein the film composition comprises
   (a) about 30% to about 45% by weight of a linear low density polyethylene,
   (b) about 1% to about 10% by weight of a low density polyethylene, and
   (c) about 40% to about 60% by weight of calcium carbonate filler particles.

23. The film of claim 22 wherein the composition further contains high density polyethylene and titanium dioxide.

* * * * *